United States Patent
Yu

(10) Patent No.: US 10,735,948 B2
(45) Date of Patent: Aug. 4, 2020

(54) IDENTIFYING AND CONTROLLING REMOTE USER EQUIPMENT ON NETWORK SIDE

(71) Applicant: Huawei Technologies Co., Ltd., Shenzhen (CN)

(72) Inventor: Youyang Yu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/672,246

(22) Filed: Nov. 1, 2019

(65) Prior Publication Data

US 2020/0068385 A1 Feb. 27, 2020

Related U.S. Application Data

(63) Continuation of application No. PCT/CN2018/097769, filed on Jul. 31, 2018.

(30) Foreign Application Priority Data

Aug. 15, 2017 (CN) .......................... 2017 1 0697315

(51) Int. Cl.
*H04W 8/24* (2009.01)
*H04L 12/721* (2013.01)
(Continued)

(52) U.S. Cl.
CPC ............... *H04W 8/24* (2013.01); *H04L 45/38* (2013.01); *H04L 45/741* (2013.01);
(Continued)

(58) Field of Classification Search
CPC ..................................................... H04W 8/24
(Continued)

(56) References Cited

U.S. PATENT DOCUMENTS

2018/0176927 A1  6/2018  Deng et al.

FOREIGN PATENT DOCUMENTS

CN    101127698 A    2/2008
CN    103596166 A    2/2014
(Continued)

OTHER PUBLICATIONS

"3rd Generation Partnership Project; Technical Specification Group Services and System Aspects; System Architecture for the 5G System; Stage 2 (Release 15)," 3GPP TS 23.501 V1.2.0, pp. 1-166, 3rd Generation Partnership Project, Valbonne, France (Jul. 2017).
(Continued)

*Primary Examiner* — Joel Ajayi
(74) *Attorney, Agent, or Firm* — Leydig, Voit & Mayer, Ltd.

(57) ABSTRACT

A method for identifying and controlling remote user equipment on a network side includes: receiving, by a session management device, an identifier of a remote user equipment, and generating, based on the identifier, a policy related to the remote user equipment, where the policy includes the identifier of the remote user equipment; sending the policy to a user plane function device; and identifying, by the user plane function device, a packet of the remote user equipment based on the policy, and implementing policy control on the remote user equipment based on the policy. According to the method, the network side can be compatible with service access of the remote user equipment and can perform service management and policy control on the remote user equipment.

18 Claims, 8 Drawing Sheets

(51) Int. Cl.
    *H04L 12/749*     (2013.01)
    *H04L 29/12*     (2006.01)
    *H04L 29/06*     (2006.01)
    *H04W 8/18*     (2009.01)
    *H04W 48/16*     (2009.01)
    *H04W 80/02*     (2009.01)

(52) U.S. Cl.
    CPC ...... *H04L 61/6022* (2013.01); *H04L 61/6059* (2013.01); *H04L 69/22* (2013.01); *H04W 8/18* (2013.01); *H04W 48/16* (2013.01); *H04W 80/02* (2013.01)

(58) Field of Classification Search
    USPC .......................................................... 455/419
    See application file for complete search history.

(56) References Cited

FOREIGN PATENT DOCUMENTS

| WO | 2017028294 A1 | 2/2017 |
|---|---|---|
| WO | 2017042626 A1 | 3/2017 |

OTHER PUBLICATIONS

"3rd Generation Partnership Project; Technical Specification Group Core Network and Terminals; Interface between the Control Plane and the User Plane of EPC Nodes; Stage 3 (Release 14)," 3GPP TS 29.244 V14.0.0, pp. 1-137, 3rd Generation Partnership Project, Valbonne, France (Jun. 2017).

"3rd Generation Partnership Project; Technical Specification Group Services and System Aspects; Procedures for the 5G System; Stage 2 (Release 15)," 3GPP TS 23.502 V0.5.0, pp. 1-148, 3rd Generation Partnership Project, Valbonne, France (Jul. 2017).

"3rd Generation Partnership Project; Technical Specification Group Radio Access Network; Study on Scenarios and Requirements for Next Generation Access Technologies; (Release 14)," 3GPP TR 38.913 V14.3.0, XP051336696, pp. 1-39, 3rd Generation Partnership Project, Valbonne, France (Jun. 2017).

"3rd Generation Partnership Project; Technical Specification Group Services and System Aspects; Service requirements for next generation new services and markets; Stage 1 (Release 15)," 3GPP TS 22.261 V0.2.0. XP051215735, pp. 1-28, 3rd Generation Partnership Project, Valbonne, France (Nov. 2016).

IDENTIFYING AND CONTROLLING REMOTE USER EQUIPMENT ON NETWORK SIDE

CROSS-REFERENCE TO RELATED APPLICATIONS

This application is a continuation of International Application No. PCT/CN2018/097769, filed on Jul. 31, 2018, which claims priority to Chinese Patent Application No. 201710697315.X, filed on Aug. 15, 2017. The disclosures of the aforementioned patent applications are hereby incorporated by reference in their entireties.

TECHNICAL FIELD

This application relates to the field of communications technologies, and in particular, to a method for identifying and controlling a remote user equipment on a network side.

BACKGROUND

To meet a challenge of wireless broadband technologies and maintain a leading advantage of a $3^{rd}$ Generation Partnership Project (3GPP) network, the 3GPP standard organization developed a next generation mobile communications network architecture, namely, a fifth generation (5G) network architecture, at the end of 2016. The architecture not only supports wireless technologies, such as Long-Term Evolution (LTE) and 5G radio access network (RAN), defined by the 3GPP standard group, in accessing a core network (CN), but also supports a non-3GPP access technology in accessing a core network by using a non-3GPP interworking function (N3IWF) or a next generation packet data gateway (NGPDG).

Core network functions are classified into a user plane function (UPF) and a control plane function (CPF). The user plane function is responsible for packet forwarding, quality of service (QoS) control, charging information statistics, and the like. The control plane function is responsible for user registration and authentication, mobility management, delivery of a packet forwarding policy and a QoS control policy to the user plane function (UPF), and the like.

Subsequently, in addition to a user equipment (UE) of a mobile operator, the 5G core network (5G CN) needs to support a third-party user equipment, also referred to as a remote user equipment, such as a wearable user equipment, a fixed-line terminal device, a television (TV), and a personal computer (PC). The remote user equipment may not support a subscriber identification module (SIM) card of the mobile operator. A network side cannot detect remote user equipment that has no SIM card, failing to support 5G CN in management and control of the remote user equipment.

SUMMARY

In view of this, an embodiment of this application provides a method for identifying and controlling a remote user equipment on a network side.

According to a first aspect, a method for identifying and controlling a remote user equipment on a network side is provided, including: receiving, by a session management device, an identifier of a remote user equipment; generating, based on the identifier of the remote user equipment, a policy related to the remote user equipment, where the policy includes the identifier of the remote user equipment; and delivering the generated policy to a user plane function, where the policy is used by the user plane function to perform service control on the remote user equipment. According to the method, a network side device can identify and control the remote user equipment, improving compatibility of the network side device.

Optionally, the receiving, by a session management device, an identifier of a remote user equipment is performed in a control plane manner or a user plane manner. In the control plane manner, the session management device receives a session message or a registration message from a relay user equipment, where the session message or the registration message includes the identifier of the remote user equipment.

In the user plane manner, the session management device receives an interface message from the UPF, where the interface message includes the identifier of the remote user equipment. Specifically, the interface message may be an N4 interface message.

Optionally, the policy includes a packet probing parameter, where the packet probing parameter includes the identifier of the remote user equipment, and the packet probing parameter is used to match a user plane packet that is from the remote user equipment.

Optionally, the method further includes: receiving, by the session management device, at least one of a circuit identifier of the remote user equipment, a device type of the remote user equipment, and an association identifier of the remote user equipment.

Optionally, the receiving, by the session management device, at least one of a circuit identifier of the remote user equipment, a device type of the remote user equipment, and an association identifier of the remote user equipment includes:

receiving, by the session management device, a session message or a registration message sent by a relay user equipment, where the session message or the registration message includes at least one of the association identifier of the remote user equipment, the circuit identifier, and the device type; or receiving, by the session management device, a session message sent by a mobility management function (e.g., an access and mobility management function (AMF)), where the session message includes at least one of the association identifier of the remote user equipment, the circuit identifier, and the device type, and specifically, the session message may be an N11 interface message; or receiving, by the session management device, an interface message sent by the UPF, where the interface message includes at least one of the association identifier of the remote user equipment, the circuit identifier, and the device type, and specifically, the interface message may be an N4 interface message. The circuit identifier (CID) is used to identify user access circuit information, such as a frame, a slot, and a port. An operator identifies a user and performs access control based on the circuit identifier. The association identifier of the remote user equipment is used to associate a plurality of different identifiers of the remote user equipment, and indicates that the plurality of different identifiers of the remote user equipment refer to same remote user equipment.

Optionally, the policy further includes at least one of the following:

an IP address assigned by the session management device to the remote user equipment, where the IP address is used to instruct the UPF to replace the identifier of the remote user equipment in a matched packet with the IP address;

a user packet header update instruction, used to instruct the UPF to delete a specific packet header from the matched packet or add a specific packet header to the matched packet; and a user equipment IP address assignment instruction, used to instruct the UPF to assign an IP address to the remote user equipment and replace the identifier of the remote user equipment in the matched packet with the IP address of the remote user equipment that is assigned by the UPF.

According to a second aspect, a method for identifying and controlling a remote user equipment on a network side is provided, including:

receiving, by a session management device, an identifier of a remote user equipment;

generating, by the session management device based on the identifier of the remote user equipment, a policy related to the remote user equipment, where the policy includes the identifier of the remote user equipment;

sending, by the session management device, the policy to a user plane function (UPF), where the policy is used by the UPF to perform service control on the remote user equipment;

receiving, by the UPF, a packet from the remote user equipment, where the packet includes the identifier of the remote user equipment; and performing, by the user plane function based on the policy, service control on the packet sent by the remote user equipment.

Optionally, the identifier of the remote user equipment is an IPv6 interface ID, the packet probing parameter includes the IPv6 interface ID, and the identifying, by the UPF based on the packet probing parameter and on the identifier of the remote user equipment in the packet, the packet sent by the remote user equipment includes: matching, by the UPF, the IPv6 interface ID in the packet probing parameter with a source IP address in an IP header of the packet, to identify the packet sent by the remote user equipment.

Optionally, the packet probing parameter includes the port number, and the identifying, by the UPF based on the packet probing parameter and on the identifier of the remote user equipment in the packet, the packet sent by the remote user equipment includes: matching, by the UPF, the port number in the packet probing parameter with a port number in a transport layer of the packet, to identify the packet sent by the remote user equipment.

Optionally, the identifier of the remote user equipment is a Media Access Control (MAC) address, the packet probing parameter includes the MAC address, and the identifying, by the UPF based on the packet probing parameter and on the identifier of the remote user equipment in the packet, the packet sent by the remote user equipment includes:

matching, by the UPF, the MAC address in the packet probing parameter with an L2 MAC address in the packet, to identify the packet sent by the remote user equipment.

According to a third aspect, a session management device is provided, including a transceiver interface, a processor, and a memory, where the memory stores a computer program executable by the processor, the computer program includes computer readable instructions, and the readable instructions include:

an instruction used to enable the transceiver interface to receive an identifier of a remote user equipment;

an instruction used to enable the processor to generate, based on the identifier of the remote user equipment, a policy related to the remote user equipment, where the policy includes the identifier of the remote user; and an instruction used to enable the transceiver interface to send the policy to a user plane function, where the policy is used by the UPF to perform service control on the remote user equipment.

According to a fourth aspect, a user plane function device is provided, including a transceiver interface, a processor, and a memory, where the memory stores a computer program executable by the processor, the computer program includes computer readable instructions, and the readable instructions include:

an instruction used to enable the transceiver interface to receive a policy that is related to remote user equipment and that is sent by a session management device, where the policy includes an identifier of the remote user equipment;

an instruction used to enable the transceiver interface to receive a packet from the remote user equipment, where the packet includes a device identifier of the remote user equipment; and an instruction used to enable the processor to perform, based on the policy, service control on the packet sent by the remote user equipment.

According to a fifth aspect, an apparatus is provided, including: a transceiver, configured to receive a network access request from a remote user equipment; and a processor, configured to assign an identifier to the remote user equipment, where the transceiver is further configured to report, to a network side device, the identifier assigned by the processor to the remote user equipment, where the identifier of the remote user equipment is used by the network side device to perform service control on the remote user equipment.

Optionally, that the transceiver reports, to a network side device, the identifier assigned by the processor to the remote user equipment includes: sending, by the transceiver, a session message or a registration message to the network side device, where the session message or the registration message includes the identifier of the remote user equipment.

Optionally, the transceiver further receives a packet sent by the remote user equipment, and after the processor encapsulates the identifier of the remote user equipment into the packet, the transceiver sends, to the network side device, the packet in which the identifier of the remote user equipment is encapsulated.

According to a sixth aspect, a session management device is provided. The session management device has a function of implementing the session management device in the method according to the first aspect or the method according to the second aspect. The function may be implemented by using hardware, or may be implemented by hardware executing corresponding software. The hardware or the software includes one or more modules (units) corresponding to the function.

According to a seventh aspect, a user plane function device is provided. The user plane function device has a function of implementing the user plane function device in the method according to the second aspect. The function may be implemented by using hardware, or may be implemented by hardware executing corresponding software. The hardware or the software includes one or more modules (units) corresponding to the function.

According to an eighth aspect, a communications system is provided, including the foregoing session management device and user plane function device.

According to a ninth aspect, a computer program product is provided, including executable program code, where the program code includes an instruction. When a processor executes the instruction, the instruction enables a session management device to perform the method for controlling a remote user equipment according to the foregoing aspects.

According to a tenth aspect, a computer program product is provided, including executable program code, where the program code includes an instruction. When a processor executes the instruction, the instruction enables a user plane function device to perform the method for controlling a remote user equipment according to the foregoing aspects.

According to an eleventh aspect, an embodiment of this application provides a computer storage medium configured to store a computer software instruction used by the foregoing session management device, where the computer software instruction includes a program designed to perform the foregoing aspects.

According to a twelfth aspect, an embodiment of this application provides a computer storage medium configured to store a computer software instruction used by the foregoing user plane function device, where the computer software instruction includes a program designed to perform the foregoing aspects.

According to a thirteenth aspect, a chip system is provided. The chip system includes a processor configured to support the foregoing apparatus, session management device, and user plane function device in implementing the related functions in the foregoing aspects, for example, receiving an identifier of a remote user equipment, generating a policy of related to the remote user equipment based on the identifier, and delivering the policy to the user plane function device. In a possible design, the chip system further includes a memory, and the memory is configured to store a program instruction and data that are necessary for a communications device. The chip system may include a chip, or may include a chip and another discrete device.

According to the foregoing aspects, the network side can be compatible with service access of the remote user equipment and can perform service management and policy control on the remote user equipment.

DESCRIPTION OF EMBODIMENTS

The following describes technical solutions in embodiments of this application with reference to the accompanying drawings.

Figure 1A:
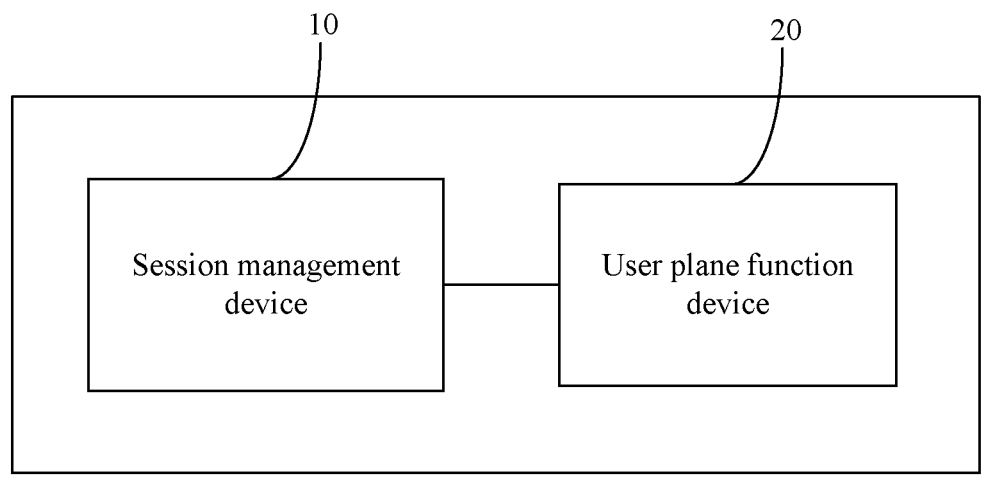
FIG. 1A is an architectural diagram of a system to which an embodiment of this application is applied.

FIG. 1A is an architectural diagram of a system to which an embodiment of this application is applied. As shown in FIG. 1A, the system includes a session management device 10 and a user plane function device 20. The session management device 10 is responsible for functions such as session establishment, location management, service control, and policy generation and delivery. The user plane function device 20 is responsible for functions such as packet forwarding and policy execution.

Specifically, the session management device 10 is configured to: receive an identifier of a remote user equipment; generate, based on the identifier of the remote user equipment, a policy related to the remote user equipment, where the policy includes the identifier of the remote user equipment; and deliver the generated policy to a user plane function device, where the policy is used by the user plane function device to perform service control on the remote user equipment.

The user plane function device 20 is configured to receive a packet from the remote user equipment, and is further configured to receive the policy that is related to the remote user equipment and that is delivered by the session management device, and perform, based on the policy, service control on the packet sent by the remote user equipment.

Optionally, the session management device and the user plane function device in FIG. 1A may be implemented by one physical device, or may be implemented by a plurality of physical devices, or may be a logical function module in a physical device. This is not specifically limited in this embodiment of this application.

Figure 1B:
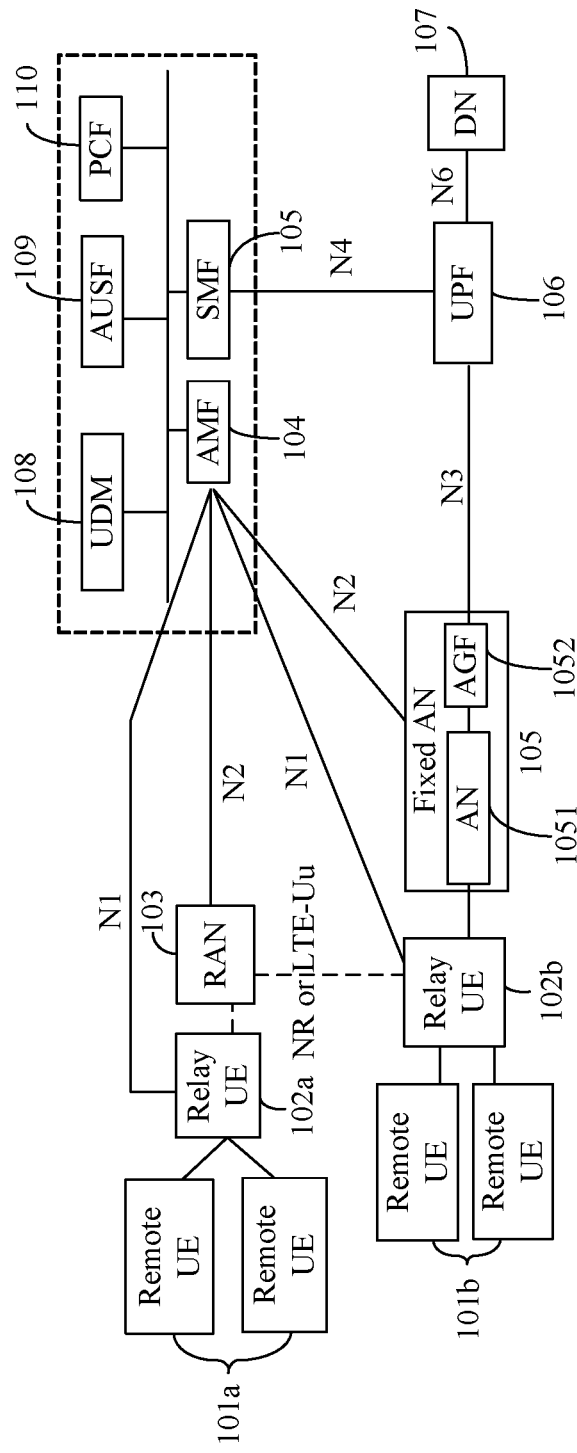
FIG. 1B is an example of an architectural diagram of a system according to an embodiment of this application.

The session management device and the user plane function device in FIG. 1A respectively correspond to a session management function (SMF) and a UPF in FIG. 1B.

FIG. 1B is an architectural diagram of another system to which an embodiment of this application is applied. The system architecture may be a specific implementation example of FIG. 1A. As shown in FIG. 1B, the system includes: remote user equipments (Remote UEs) 101a, remote UEs 101b, a relay user equipment (Relay UE) 102a, and a relay UE 102b, where the relay UE 102a is a wireless user equipment, and may access a core network (CN) by using a radio access network (RAN) 103. The relay UE 102a may further communicate with an AMF 104 through an N1 interface. The relay UE 102b may access the CN by using a fixed access network (Fixed AN) 105. The relay UE 102b may also communicate with the AMF 104 through an N1 interface. The fixed access network 105 includes an access network (AN) 1051 and an access gateway function (AGF) 1052. The AGF 1052 communicates with a UPF 106 through an N3 interface.

The CN is divided into a control plane function (CPF) and the user plane function (UPF) 106. The user plane function 106 is responsible for packet forwarding, QoS control, charging information statistics, and the like. The UPF 106 may communicate with an SMF 105 through an N4 interface, and may further communicate with a data network (DN) 107 through an N6 interface.

The control plane function is responsible for user registration and authentication, mobility management, and delivery of a packet forwarding policy, a QoS control policy, and the like to the UPF 106. The control plane function includes the access and mobility management function (AMF) 104 and the session management function (SMF) 105. Specifically, the AMF 104 is responsible for a registration procedure during user access and location management during movement of a user. The SMF 105 is responsible for establishing a corresponding session connection on a network side when a user initiates a service, to provide a specific service for the user. The SMF 105 further delivers the packet forwarding policy, a QoS policy, and the like to the UPF 106 through the N4 interface.

The system further includes a data network (DN) 107 that provides a service for user equipment, for example, provides a mobile operator service, an Internet service, or a third-party service. A unified subscriber data management (UDM) 108 is configured to store subscription data of the user equipment. An authentication server function (AUSF) 109 is responsible for authenticating the user equipment to determine legality of the user equipment. A policy control function (PCF) 110 is configured to deliver a service-related policy to the AMF 104 or the SMF 105.

A name of an interface between network elements in FIG. 1B is merely an example. In a specific implementation, the interface may have another name. This is not specifically limited in this embodiment of this application.

It should be noted that the remote user equipment, the relay user equipment, the AMF, the SMF, the UDSF, the AUSF, the UDM, the UPF, or the like in FIG. 1B are merely names, and the names do not constitute any limitation as to the devices. In a 5G network or another future network, the remote user equipment, the relay user equipment, the AMF, the SMF, the AUSF, the UDM, the UPF, or a corresponding network element or entity may have different names. This is not specifically limited in this embodiment of this application. For example, the UDM may be alternatively replaced with a home subscriber server (HSS), a user subscription database (USD), or the like. This is described collectively herein and details are not repeated again below.

The following further describes embodiments of the present application by using an example in which a remote user equipment accesses a core network by using a fixed network. In another network scenario, the access gateway function (AGF) may be replaced with a non-3GPP interworking function (N3IWF) or a RAN.

Figure 2:
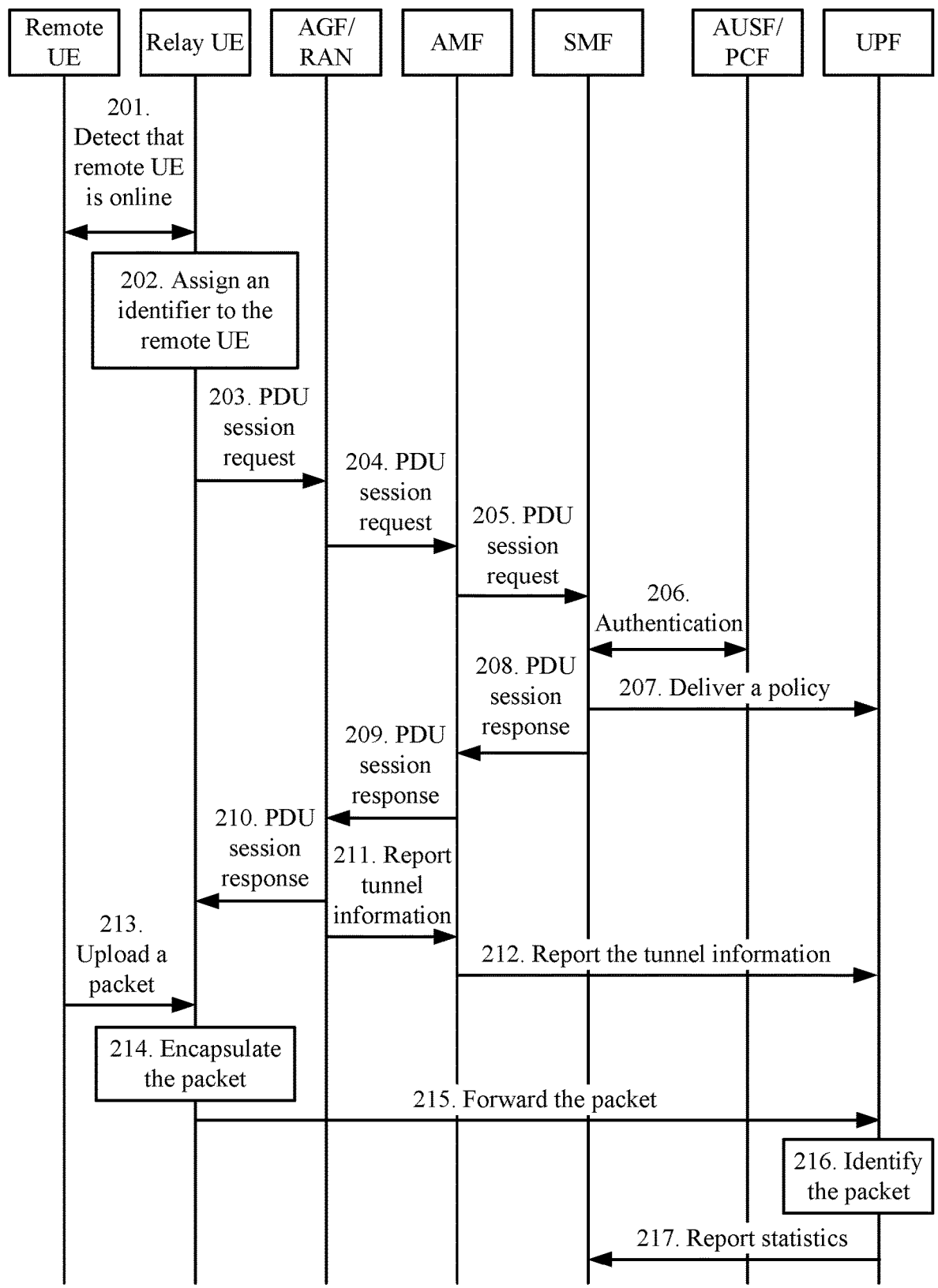
FIG. 2 is a flowchart of interactions for identifying and controlling a remote user equipment on a network side according to an embodiment of this application.

FIG. 2 is a flowchart of interactions for identifying and controlling a remote user equipment on a network side according to an embodiment of this application. As shown in FIG. 2, the method includes the following steps.

201. A relay UE detects that a remote UE gets online, and establishes a connection between the relay UE and the remote UE.

Optionally, the remote UE may establish a connection between the remote UE and the relay UE through a Bluetooth interface.

Optionally, the relay UE may further obtain a device type of the remote UE. For example, the remote UE may actively report its own device type to the relay UE in a process of establishing a connection to the relay UE. Optionally, the remote UE may further report, to the relay UE, a permanent identifier of the remote UE, for example, a MAC address or a service type indication.

Certainly, the remote UE may alternatively establish a connection to the relay UE in another access manner. A manner of establishing a connection between the relay UE and the remote UE and a manner of obtaining the device type are not limited in this embodiment of the present application.

202. The relay UE assigns a temporary identifier to the remote UE.

Optionally, the relay UE assigns an IPv6 interface ID to the remote UE, and uses the IPv6 interface ID as the temporary identifier of the remote UE.

Optionally, the relay UE may alternatively use a port number as the temporary identifier of the remote UE.

Optionally, if the relay UE receives the permanent identifier such as the MAC address of the remote UE that is sent by the remote UE, the relay UE may alternatively use the permanent identifier as the temporary identifier of the remote UE.

203. The relay UE sends a protocol data unit (PDU) session request message to an AGF or a RAN, where the PDU session request message carries the temporary identifier of the remote UE.

Specifically, the relay UE may determine, based on at least one of the device type of the remote UE or the service type indication sent by the remote UE, whether an existing PDU session can serve the remote UE. If the existing PDU session cannot serve the remote UE, the relay UE initiates a new PDU session establishment request message. If the existing PDU session can serve the remote UE, the relay UE selects a suitable PDU session based on at least one of the device type of the remote UE or the service type sent by the remote UE, and sends a PDU session update request message. The PDU session update request message includes parameters such as a PDU session identifier and a data network name (DNN) identifier. The DNN identifier is determined by the device type of the remote UE or a type of a service requested by the remote UE.

Using a PDU session update request message as an example, the relay UE sends a PDU session update request message to the AGF, where the PDU session update request message includes a PDU session identifier, for example, at least one of a temporary identifier of the relay UE, a MAC address of the relay UE, or an international mobile subscriber identity (IMSI) of the relay UE. In addition, the message further includes the temporary identifier that is assigned by the relay UE to the remote UE. Optionally, the PDU session update request message may further carry the device type of the remote UE, a circuit identifier (CID) of the remote UE, and an association identifier of the remote user equipment. The CID is used to identify access circuit information of the remote user equipment, such as a frame, a slot, and a port. The association identifier of the remote user equipment is used to associate a plurality of different identifiers of the remote user equipment, and indicates that the plurality of different identifiers of the remote user equipment refer to same remote user equipment.

204. The AGF forwards the received PDU session request message to an AMF through an N2 interface.

205. The AMF forwards the received PDU session request message to an SMF through an N11 interface.

206. The SMF or an AUSF performs authentication on the remote user equipment.

It should be noted that this step is optional.

Specifically, the SMF performs authentication on the remote user equipment based on at least one of the temporary identifier of the remote user equipment, the circuit identifier of the remote user equipment, the device type of the remote device, or the association identifier of the remote user equipment.

Optionally, the SMF may first obtain service-related policy information from a policy control function (PCF), and match at least one of the temporary identifier of the remote device, the circuit identifier of the remote device, the device type of the remote user equipment, or the association identifier of the remote user equipment based on the policy information. When the match succeeds, the authentication succeeds.

Optionally, the SMF may send at least one of the temporary identifier of the remote device, the circuit identifier of the remote device, the device type of the remote user equipment, or the association identifier of the remote user equipment to the authentication function entity (AUSF) for authentication. After the authentication succeeds, the SMF receives an authentication success indication sent by the AUSF.

207. The SMF delivers a policy to a UPF based on the temporary identifier of the remote UE or based on the temporary identifier of the remote UE and a device type of the remote UE.

Specifically, the SMF first generates a related policy for the remote user equipment based on the temporary identifier of the remote UE or based on the temporary identifier of the remote UE and the device type of the remote UE, and sends the related policy to the UPF through an N4 interface. The related policy may be a data flow detection rule (PDR) or a packet forwarding rule (FAR). Optionally, the related policy may be alternatively a usage reporting rule (URR), a QoS enforcement rule (QER), or a buffering action rule (BAR).

Further, the data flow detection policy further includes the temporary identifier of the remote user equipment.

Optionally, when the temporary identifier of the remote UE is the IPv6 interface ID, the PDR policy includes the IPv6 interface ID. The UPF may match the IPv6 interface ID with a source or destination IP address in an IP header of a received packet, to identify packets sent by different remote UEs.

Optionally, when the temporary identifier of the remote UE is the port number, the PDR policy includes the port number. The UPF may match the port number with a port number in a transport layer of a received packet, to identify packets sent by different remote UEs.

Optionally, when the temporary identifier of the remote UE is the MAC address of the remote UE, the PDR policy includes the MAC address. The UPF may match the MAC address identifier with an L2 MAC address in a received packet, to identify packets sent by different remote UEs.

Optionally, the SMF may further assign a new IP address to the remote UE, and send the new IP address to the UPF by using the FAR policy. Alternatively, the SMF instructs the UPF to assign a new IP address to the remote UE.

If the FAR policy includes the new IP address, for downlink data sent to the remote user equipment, the UPF replaces a destination IP address with a source IP address corresponding to the PDU session, and detects whether a destination port number is the temporary identifier of the remote UE. If the destination port number is not the temporary identifier of the remote UE, the destination port number is updated to the temporary identifier of the remote UE.

If the UPF receives an instruction that is sent by the SMF and that is used to instruct the UPF to assign the new IP address that is to be assigned by the UPF to the remote UE as instructed by the SMF, the UPF assigns the new IP address to the remote user equipment. For uplink data sent by the remote user equipment, the UPF replaces a source IP address of the remote UE with the new IP address. For the downlink data sent to the remote user equipment, the UPF replaces a destination IP address with the source IP address corresponding to the PDU session, and detects whether the destination port number is the temporary identifier of the remote UE. If the destination port number is not the temporary identifier of the remote UE, the destination port number is updated to the temporary identifier of the remote UE.

208 to 210. The SMF sends a PDU session response message to the AMF, and the AMF forwards the PDU session response message to the relay UE by using the AGF.

Specifically, the session response message may include a session update success indication.

Optionally, the SMF further sends session information (SM information) to the AGF or the RAN by using the AMF. The session information includes a QoS file, a PDU session identifier parameter, a tunnel identifier (TID) of the UPF, and the like. After receiving the session information, the AGF or the RAN parses the session information, and obtains and stores the tunnel identifier of the UPF.

211 and 212. The AGF or the RAN assigns a tunnel identifier to itself and sends the tunnel identifier to the AMF, the AMF sends the tunnel identifier of the AGF or the RAN to the SMF through the N11 interface, and the SMF notifies the UPF of the tunnel identifier of the AGF or the RAN through an N4 interface.

In this case, the UPF also obtains the related tunnel identifier of the RAN. The UPF stores the tunnel identifier, and establishes a PDU connection between the UPF and the RAN based on the tunnel identifier.

213. The remote UE sends a packet to the relay UE. For example, the remote UE transfers the packet to the relay UE through a Bluetooth interface.

214. The relay UE encapsulates the temporary identifier of the remote UE for the packet uploaded by the remote UE.

Specifically, if the temporary identifier of the remote UE is the IPv6 interface ID, the relay UE sets a source IP prefix in the packet to an IPv6 prefix corresponding to the relay UE and sets an IPv6 interface ID to the IPv6 interface ID corresponding to the remote UE.

Optionally, if the temporary identifier of the remote UE is the port number, the relay-UE sets a source IP address of the packet to an IP address corresponding to the relay UE and sets the port number in the transport layer to the port number corresponding to the remote UE.

215. The relay UE sends the encapsulated packet to the UPF through an N3 interface.

216. After receiving the packet sent by the relay UE, the UPF identifies the packet of the remote UE based on the PDR policy and on the temporary identifier of the remote UE in the packet.

Optionally, when the temporary identifier of the remote UE is the IPv6 interface ID, the PDR policy includes the IPv6 interface ID. The UPF may match a source or destination IP address in an IP header of a received packet based on the IPv6 interface ID, to identify packets sent by different remote UEs.

Optionally, when the temporary identifier of the remote UE is the port number, the PDR policy includes the port number. The UPF may match a port number in a transport layer of a received packet based on the port number, to identify packets sent by different remote UEs.

Optionally, when the temporary identifier of the remote UE is the MAC address of the remote UE, the PDR policy includes the MAC address. The UPF may match the MAC address identifier based on an L2 MAC address in a received packet, to identify packets sent by different remote UEs.

Optionally, the UPF may further perform related processing on the packet based on a related policy that is received in advance and that corresponds to the remote UE, for example, perform corresponding processing on the packet based on the QER, URR or BAR policy.

217. The UPF collects statistics about charging information of the remote user equipment, and reports the charging information to the SMF, and the SMF performs policy adjustment for the remote user equipment based on the charging information.

In this embodiment, the remote UE may access a core network by using the relay UE, and the remote UE may be identified on the network side based on the temporary identifier assigned by the relay UE to the remote UE. In addition, the network side may configure different QoS management mechanisms, define different charging information reporting policies, and the like based on the device type of the remote UE or the service type of the remote UE. The UPF may perform corresponding policy control on an identified data flow of the remote UE. In this way, a 5G core network implements identification, management, and control on the remote user equipment.

Figure 3:
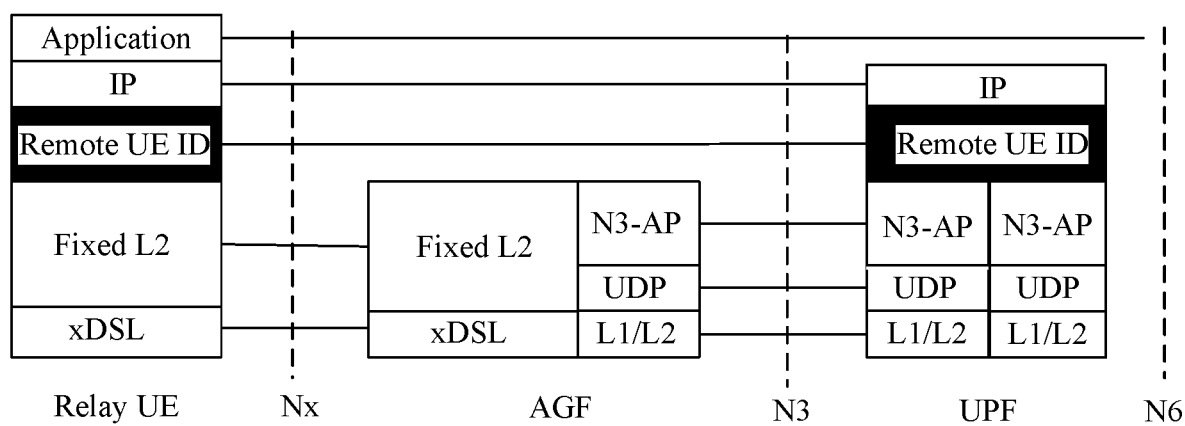
FIG. 3 is a structural diagram of a protocol layer according to an embodiment of this application.

A second embodiment of this application is described below. In this embodiment, a protocol layer needs to be added between a relay UE and a UPF. As shown in FIG. 3, a remote UE ID protocol layer is added between existing protocol layers. A remote UE ID is carried by using the protocol layer, so that the UPF can identify a packet of a remote user equipment based on the remote UE ID. This ensures that the remote user equipment can communicate with the UPF.

Figure 4:
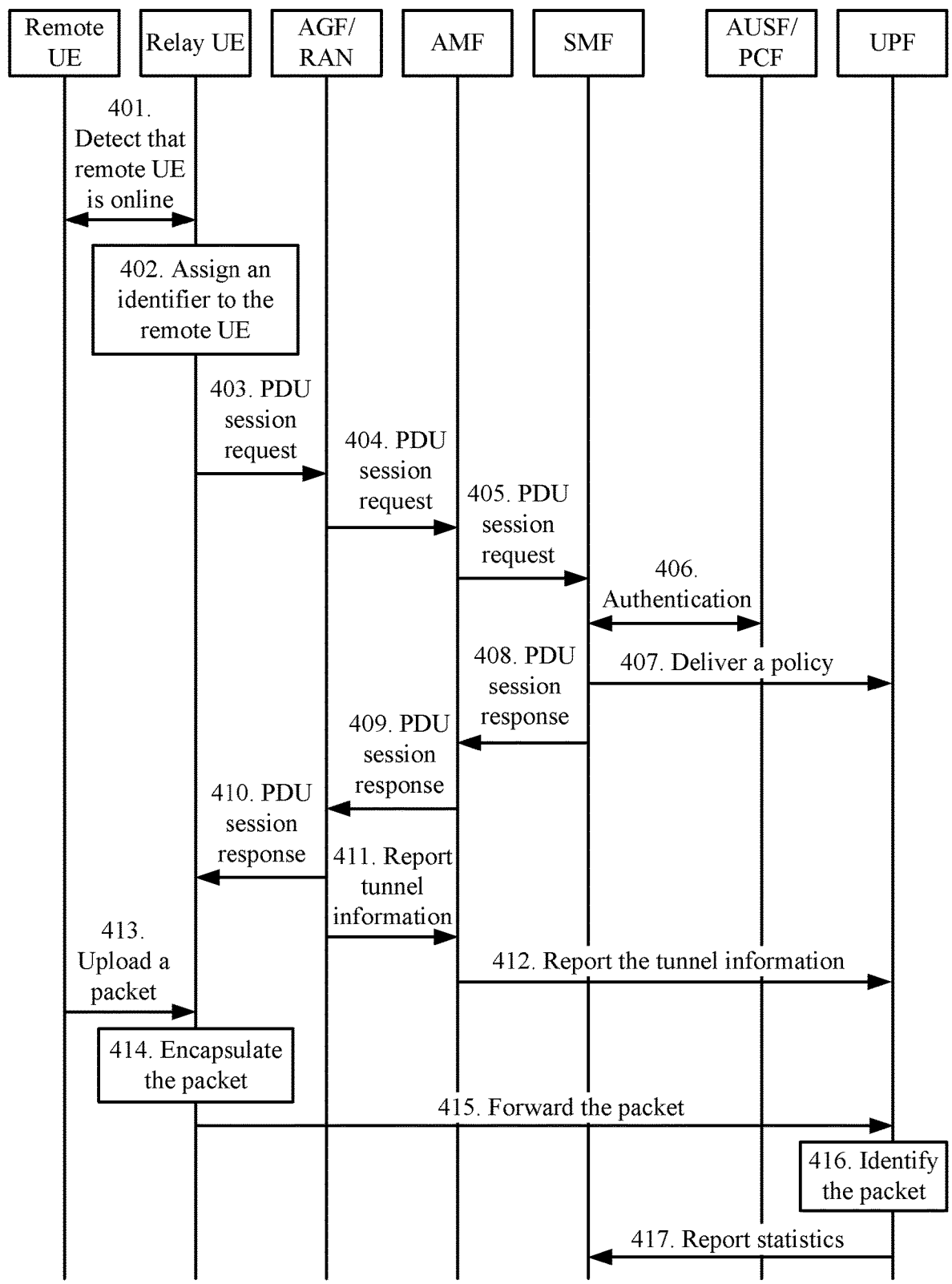
FIG. 4 is a flowchart of interactions for identifying and controlling a remote user equipment on a network side according to another embodiment of this application.

In this embodiment, an identifier of the remote user equipment is sent to a network side by using a control plane. FIG. 4 is a signaling interaction diagram according to an embodiment. As shown in FIG. 4, a method for identifying and controlling a remote user equipment on a network side in this embodiment includes the following steps:

401. A relay UE detects that a remote UE gets online, and establishes a connection between the relay UE and the remote UE.

For specific implementation of this step, refer to step 201. Details are not repeated herein again.

402. The relay UE assigns a temporary identifier to the remote UE.

Optionally, the temporary identifier may be a logical identifier. For example, a numerical value in an Int format is defined as the temporary identifier of the device, or an identifier in a character string format is defined as the temporary identifier of the device.

It should be noted that, in this embodiment, the logical identifier may be implemented in a plurality of forms. No limitation is imposed herein.

For specific implementation of steps 403 to 413, refer to steps 203 to 213. Details are not repeated herein again.

In this embodiment, the temporary identifier of the remote UE is a logical identifier, and cannot be directly identified by a UPF. Therefore, a protocol layer needs to be added between the relay UE and the UPF, to facilitate communication between the relay UE and the UPF.

A third embodiment of this application is described below. In this embodiment, a protocol layer needs to be added between a relay UE and a UPF. As shown in FIG. 3, a remote UE ID protocol layer is added between existing protocol layers. A remote UE ID is carried by using the protocol layer, so that the UPF can identify a packet of a remote user equipment based on the remote UE ID. This ensures that the remote user equipment can communicate with the UPF.

Figure 5:
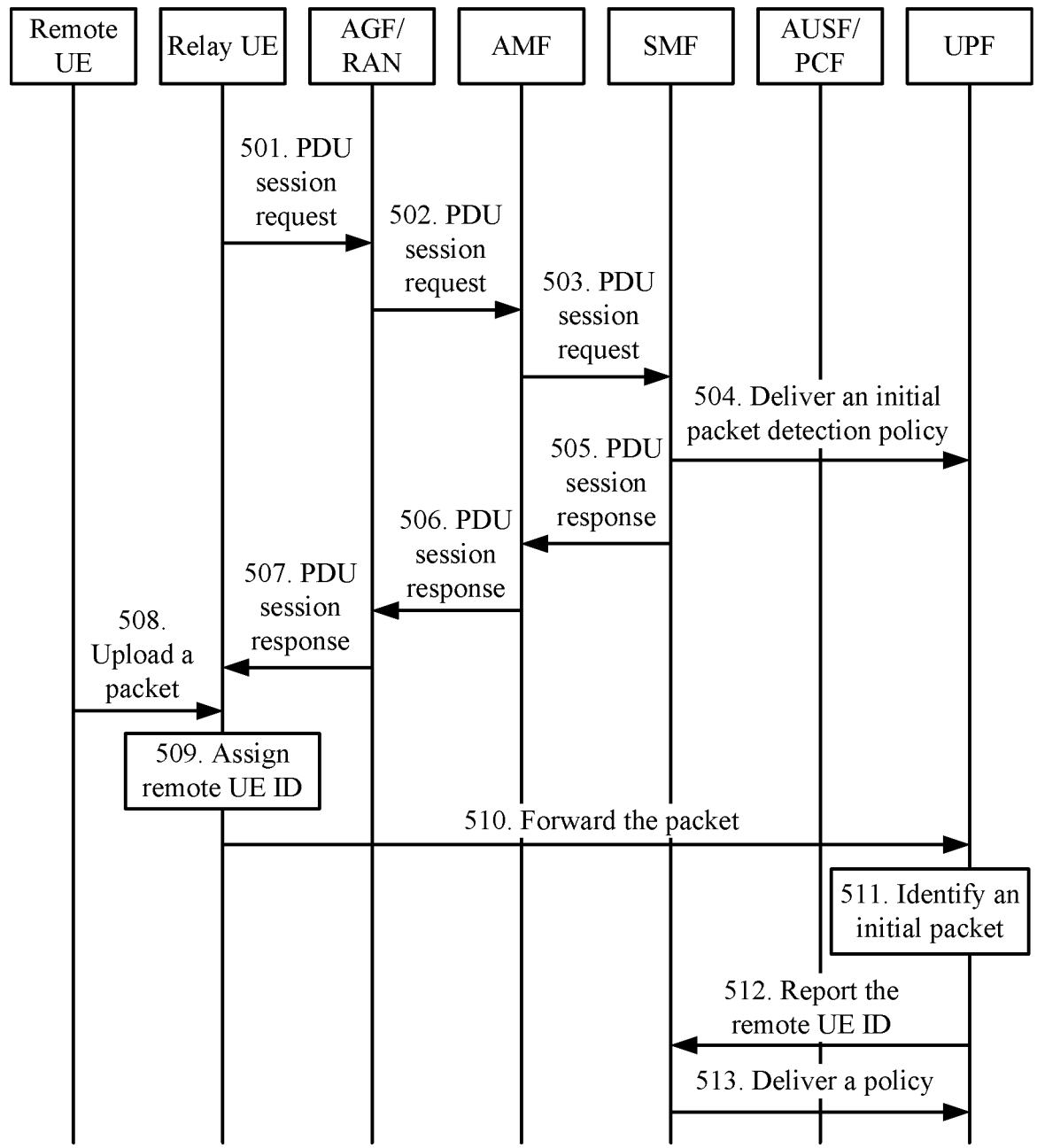
FIG. 5 is a flowchart of interactions for identifying and controlling a remote user equipment on a network side according to still another embodiment of this application.

In addition, in this embodiment, an identifier of the remote user equipment is sent to a network side by using a user plane. As shown in FIG. 5, a method for identifying and controlling a remote user equipment on a network side in this embodiment includes the following steps:

501 to 503. The relay UE initiates a PDU session establishment request to an AGF or a RAN, and the AGF or the RAN forwards the PDU session establishment request to an SMF by using an AMF.

504. The SMF sends an N4 interface message to the UPF, where the N4 interface message includes an initial packet detection policy.

Specifically, the SMF delivers a PDR policy to the UPF, where the PDR policy includes a wildcard character of the remote UE ID. The PDR policy is used to instruct the UPF to forward a packet or packet header information that matches the wildcard character to the SMF.

505 to 507. A network side completes a PDU session establishment procedure.

508. The relay UE establishes a connection to the remote UE, and receives a packet uploaded by the remote UE.

509. The relay UE assigns a temporary identifier remote UE ID to the remote UE.

For details, refer to step 402.

510. The relay UE encapsulates the assigned temporary identifier into a packet header, and forwards the packet to the UPF.

Optionally, the temporary identifier may be carried by a parameter of the interface message, or may be carried in a user plane packet included in the message.

Optionally, the relay UE may further encapsulate a device type of the remote UE into the packet header and send the packet to the UPF.

511. The UPF discovers, based on the initial packet detection policy, an initial packet sent by the remote UE. To be specific, the UPF determines that the remote UE ID carried in the packet header can match only a wildcard character.

512. The UPF forwards the packet to the SMF based on a corresponding FAR policy, or the UPF obtains the remote UE ID in the packet header and a device type of the remote UE in the packet header, and sends the remote UE ID and the device type to the SMF.

513. The SMF obtains the remote UE ID and the device type of the remote UE, and generates and delivers a policy corresponding to the remote user equipment.

Subsequently, after receiving a packet of the remote user equipment that is forwarded by the relay UE, the UPF can perform corresponding policy processing on the received packet based on the policy corresponding to the remote user equipment. For details, refer to FIG. 2.

The steps and functions related to the SMF and the UPF in the foregoing method embodiments can be respectively performed by the session management device (or the SMF) and the user plane function device (or the UPF) in FIG. 1A and FIG. 1B.

In this embodiment, the user plane function device sends identification information of the remote user and the device type or service type of the remote user to the network side. The network side may configure different QoS management mechanisms, define different charging information reporting policies, and the like based on the device type or service type of the remote UE. The UPF may perform corresponding policy control on an identified data flow of the remote UE. In this way, a 5G core network implements identification, management, and control on the remote user equipment.

Figure 6:
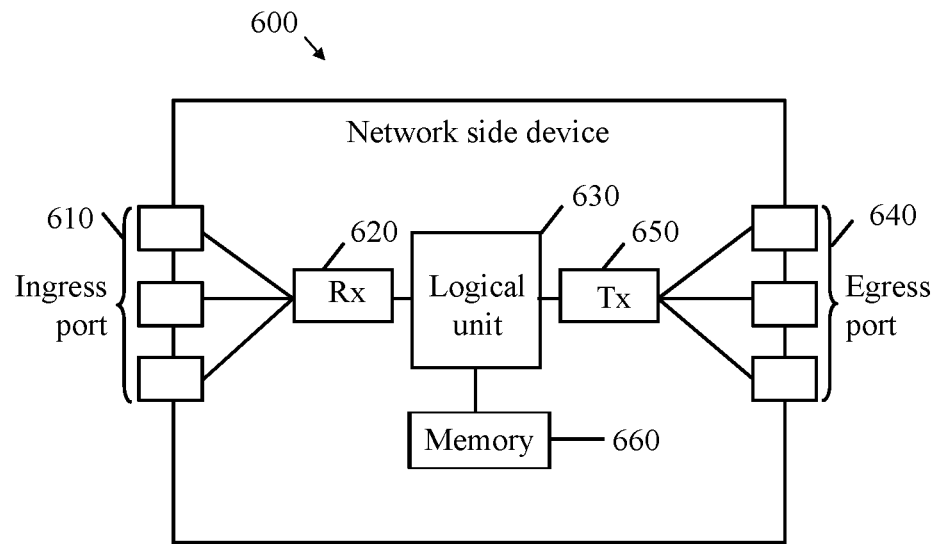
FIG. 6 is a schematic structural diagram of a network side device according to an embodiment of this application.

FIG. 6 is a schematic block diagram of a network side device 600 for identifying and controlling a remote user equipment according to an embodiment of this application. The network side device 600 may include: a plurality of ingress ports 610 and/or a receiver unit (Rx) 620, configured to receive data; a logical unit or processor 630, configured to process a signal; a plurality of egress ports 640 and/or a transmitter unit (Tx) 650, configured to send data to another component; and a memory 660. The network side device 600 may be applicable to implementation of any one of the foregoing disclosed features, methods, and devices. For example, the network side device 600 may be applicable to implementation of the session management device, the user plane function device, and the foregoing method for identifying and controlling a remote user equipment.

The logical unit 630 (which may be referred to as a central processing unit (CPU)) may communicate with the ingress ports 610, the receiver unit 620, the egress ports 640, the transmitter unit 650, and the memory 660. The logical unit 630 may be implemented as one or more CPU chips, a core (for example, a multi-core processor), a field programmable gate array (FPGA), an application-specific integrated circuit (ASIC), and/or a digital signal processor (DSP), and/or may be a part of one or more ASICs.

The memory 660 includes one or more disks, tape drives, optical drives, or solid-state drives; may be used for non-volatile storage of data and used as an overflow data storage device; may be configured to store a program when the program is selected for execution; and may be configured to store an instruction and data that are read during program execution. The memory 660 may be volatile and/or non-volatile, and may be a read-only memory (ROM), a random access memory (RAM), a ternary content-addressable memory (TCAM), a static random access memory (SRAM), another suitable memory type, or any combination thereof.

Specifically, when the network side device is configured to implement the foregoing session management device, an executable program stored in the memory 660 includes the following readable instructions:

an instruction used to enable the processor to generate, based on an identifier of a remote user equipment, a policy related to the remote user equipment, where the policy includes the identifier of the remote user; and an instruction used to enable the transceiver interface to send the policy to a user plane function, where the instruction is used by the UPF to perform service control on the remote user equipment.

The readable instructions further include:

an instruction used to enable the transceiver interface to receive a session request message or a registration request message from a relay user equipment, where the session request message or the registration request message includes the identifier of the remote user equipment; or an instruction used to enable the transceiver interface to receive an interface message from the UPF, where the interface message includes the identifier of the remote user equipment.

Optionally, the readable instructions further include another instruction used to enable the session management device to perform the foregoing method embodiments, for example, an instruction used to enable the session management device to perform functions of generating a policy, delivering a policy, managing a policy, and the like.

Specifically, when the network side device is configured to implement the foregoing user plane function device, an executable program stored in the memory 660 includes the following readable instructions:

an instruction used to enable the transceiver interface to receive a policy that is related to the remote user equipment and that is sent by the session management device, where the policy includes the identifier of the remote user equipment;

an instruction used to enable the transceiver interface to receive a packet from the remote user equipment, where the packet includes a device identifier of the remote user equipment; and an instruction used to enable the processor to perform, based on the policy, service control on the packet sent by the remote user equipment.

The policy includes a packet probing parameter. The packet probing parameter includes the identifier of the remote user equipment. The packet probing parameter is used to match a user plane packet that is from the remote user equipment. The readable instructions further include:

an instruction used to enable the processor to identify, based on the packet probing parameter and on the device identifier of the remote user equipment in the packet, the packet sent by the remote user equipment.

Optionally, the readable instructions further include another instruction used to enable the user plane function device to perform the foregoing method embodiments, for example, an instruction used to enable the user plane function device to perform functions of packet identification, policy control, and the like.

Figure 7:
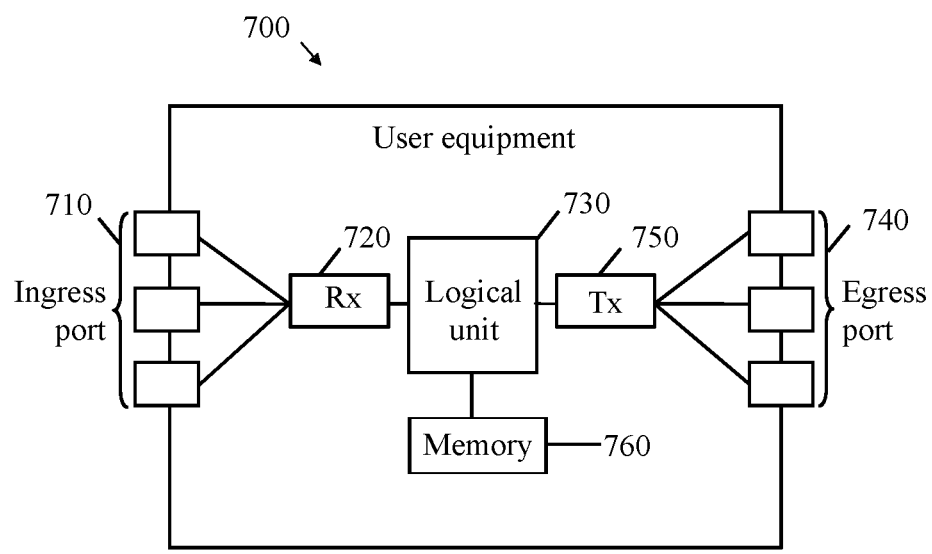
FIG. 7 is a schematic structural diagram of a user equipment according to an embodiment of this application.

FIG. 7 is a schematic structural diagram of a user equipment 700 according to an embodiment of this application. As shown in FIG. 7, the user equipment 700 includes: a plurality of ingress ports 710 and/or a receiver unit (Rx) 720, configured to receive data; a logical unit or processor 730, configured to process a signal; a plurality of egress ports 740 and/or a transmitter unit (Tx) 750, configured to send data to another component; and a memory 760.

Specifically, the logical unit 730 may be implemented as one or more CPU chips, a core (for example, a multi-core processor), a field programmable gate array (FPGA), an application-specific integrated circuit (ASIC), and/or a digital signal processor (DSP), and/or may be a part of one or more ASICs.

The memory 760 includes one or more disks, tape drives, optical drives, or solid-state drives; may be used for non-volatile storage of data and used as an overflow data storage device; may be configured to store a program when the program is selected for execution; and may be configured to store an instruction and data that are read during program execution. The memory 760 may be volatile and/or non-volatile, and may be a read-only memory (ROM), a random access memory (RAM), a ternary content-addressable memory (TCAM), a static random access memory (SRAM), another suitable memory type, or any combination thereof.

Specifically, the receiver unit 720 is configured to receive a network access request from a remote user equipment.

The logical unit 730 is configured to assign an identifier to the remote user equipment.

The transmitter unit 750 is further configured to report, to a network side device, the identifier assigned by the processor to the remote user equipment, where the identifier of the remote user equipment is used by the network side device to perform service control on the remote user equipment.

Optionally, the transmitter unit 750 sends a session message or a registration message to the network side device, where the session message or the registration message includes the identifier of the remote user equipment.

The receiver unit 720 further receives a packet sent by the remote user equipment. After the logical unit 730 encapsulates the identifier of the remote user equipment into the packet, the transmitter unit 750 sends the packet in which the identifier of the remote user equipment is encapsulated to the network side device for processing.

Figure 8:
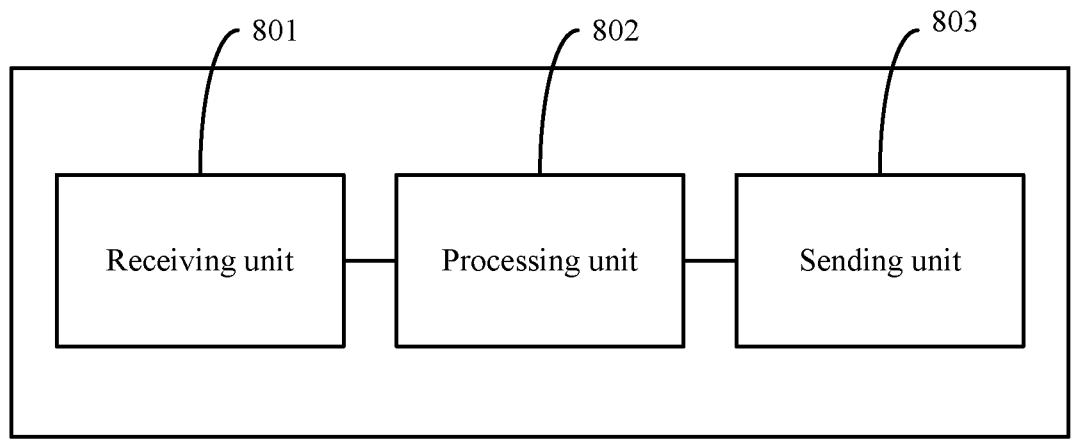
FIG. 8 is a schematic structural diagram of a session management device according to an embodiment of this application.

As shown in FIG. 8, a session management device is provided, including a receiving unit 801, a processing unit 802, and a sending unit 803. The receiving unit 801 is configured to receive an identifier of a remote user equipment. The processing unit 802 is configured to generate, based on the identifier of the remote user equipment, a policy related to the remote user equipment, where the policy includes the identifier of the remote user equipment. The sending unit 803 is configured to deliver the policy generated by the processing unit to a user plane function device, so that the user plane function device performs service control on the remote user equipment based on the policy.

The receiving unit 801 is further configured to: receive a session message or a registration message from a relay user equipment, where the session message or the registration message includes the identifier of the remote user equipment; or receive an interface message from the UPF, where the interface message includes the identifier of the remote user equipment.

The receiving unit 801 is further configured to receive at least one of a circuit identifier of the remote user equipment, a device type of the remote user equipment, and an association identifier of the remote user equipment. Specifically, the receiving unit 801 receives a session message or a registration message sent by the relay user equipment, where the session message or the registration message includes at least one of the association identifier of the remote user equipment, the circuit identifier, and the device type; or receives a session message sent by a mobility management function (e.g., an AMF), where the session message includes at least one of the association identifier of the remote user equipment, the circuit identifier, and the device type; or receives an interface message sent by the UPF, where the interface message includes at least one of the association identifier of the remote user equipment, the circuit identifier, and the device type.

The processing unit 802 is further configured to generate, based on the identifier of the remote user equipment and at least one of the association identifier of the remote user equipment, the circuit identifier, and the device type, the policy related to the remote user equipment. The policy further includes at least one of the following: an IP address of the remote user equipment, used to instruct the UPF to replace the identifier of the remote user equipment in a matched packet with the IP address of the remote user equipment; a user packet header update instruction, used to instruct the UPF to delete a specific packet header from and/or add a specific packet header to the matched packet; and a user equipment IP address assignment instruction, used to instruct the UPF to assign an IP address to the remote user equipment and replace the identifier of the remote user equipment in the matched packet with the IP address of the remote user equipment that is assigned by the UPF.

All related content of the steps related in the foregoing method embodiments can be used for functional descriptions of the corresponding functional modules. Details are not repeated herein again.

Figure 9:
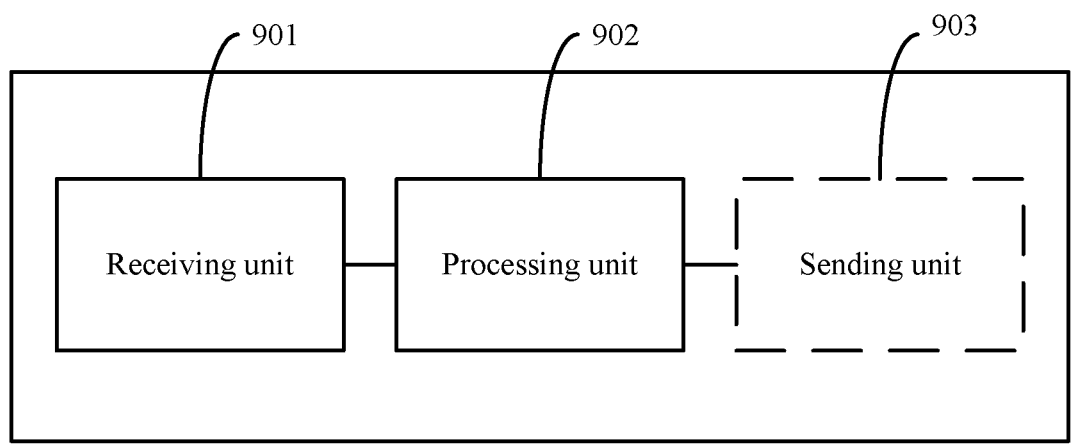
FIG. 9 is a schematic structural diagram of a user plane function device according to an embodiment of this application.

As shown in FIG. 9, a user plane function device is provided, including a receiving unit 901 and a processing unit 902. The receiving unit 901 is configured to receive a policy that is related to remote user equipment and that is sent by a session management device, and is further configured to receive a packet from the remote user equipment. The processing unit 902 is configured to perform, based on the policy, policy control on the packet from the remote user equipment.

Optionally, the user plane function device further includes a sending unit 903, configured to send an identifier of the remote user equipment to the session management device.

Specifically, the policy includes a packet probing parameter, where the packet probing parameter includes the identifier of the remote user equipment. The processing unit 902 is further configured to identify, based on the packet probing parameter and on the device identifier of the remote user equipment in the packet, the packet sent by the remote user equipment.

Optionally, the identifier of the remote user equipment is an IPv6 interface identifier (IPv6 interface ID), and the packet probing parameter includes the IPv6 interface ID. The processing unit 902 matches the IPv6 interface ID in the packet probing parameter with a source IP address in an IP header of the packet, to identify the packet sent by the remote user equipment.

Optionally, the packet probing parameter includes the port number. The processing unit 902 matches the port number in the packet probing parameter with a port number in a transport layer of the packet, to identify the packet sent by the remote user equipment.

Optionally, the identifier of the remote user equipment is a MAC address, and the packet probing parameter includes the MAC address. The processing unit 902 matches the MAC address in the packet probing parameter with an L2 MAC address in the packet, to identify the packet sent by the remote user equipment.

Optionally, the policy further includes an IP address of the remote user equipment, used to instruct the UPF to replace the identifier of the remote user equipment in a matched packet with the IP address of the remote user equipment. The processing unit 902 is further configured to replace the identifier of the remote user equipment in the packet with the IP address of the remote user equipment in the policy.

Optionally, the policy further includes: a user equipment IP address assignment instruction, used to instruct the UPF to assign an IP address to the remote user equipment. The processing unit 902 is further configured to assign the IP address to the remote user equipment, and replace the identifier of the remote user equipment in the packet with the IP address assigned by the UPF to the remote user equipment.

All related content of the steps related in the foregoing method embodiments can be used for functional descriptions of the corresponding functional modules. Details are not repeated herein again.

A person of ordinary skill in the art may be aware that, in combination with examples described in embodiments disclosed in this specification, units and algorithm steps may be implemented by electronic hardware, computer software, or a combination thereof. To clearly describe the interchangeability between the hardware and the software, the foregoing has generally described compositions and steps of each example based on functions. Whether the functions are performed by hardware or software depends on particular applications and design constraint conditions of respective technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, reference may be made to a corresponding process in a foregoing method embodiment, and details are not repeated herein again.

It should be understood that systems, apparatuses, and methods in accordance with the present application may be implemented in manners other than the manners described herein. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, may be located in one position, or may be distributed on a plurality of network units. Some or all of the units may be selected based on actual requirements to achieve objectives of solutions of embodiments of this application.

In addition, functional units in embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer readable storage medium. Based on such an understanding, technical solutions of this application may be implemented in the form of a software product. The computer software product is stored in a storage medium and includes instructions used to instruct a computer device (which may be a personal computer, a server, a network device, or the like) to perform all or some of the steps of methods described in embodiments of this application. The foregoing storage medium includes: any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary implementations of this application, but are not intended to limit the protection scope of this application. Any modification or replacement readily figured out by a person skilled in the art within the technical scope disclosed in this application may fall within the protection scope of this application.

What is claimed is:

1. A method for identifying and controlling a remote user equipment on a network side, comprising:
   receiving, by a session management device of a core network, an interface message from a user plane function (UPF) device of the core network, wherein the interface message comprises an identifier of the remote user equipment, wherein the remote user equipment is connected to the core network via a relay user equipment, and wherein the identifier of the remote user equipment is a Media Access Control (MAC) address;
   generating, by the session management device, based on the identifier of the remote user equipment, a policy for performing service control on packets from the remote user equipment, wherein the policy comprises a packet probing parameter for identification of packets from the remote user equipment, wherein the packet probing parameter comprises the MAC address, and wherein the packet probing parameter corresponds to a parameter of a user plane packet from the remote user equipment;
   sending, by the session management device, the policy to the UPF device;
   receiving, by the UPF device, a packet from the remote user equipment via the relay user equipment, wherein the packet comprises the MAC address;
   matching, by the UPF device, the MAC address in the packet with the MAC address in the packet probing parameter to identify the packet from the remote user equipment; and
   in response to the matching, performing, by the UPF device, based on the policy, service control on the packet from the remote user equipment, wherein the policy further comprises a user packet header update instruction for instructing the UPF device to delete a specific packet header from a matched packet and/or add a specific packet header to a matched packet, and wherein performing service control on the packet based on the policy further comprises deleting a specific packet header from the packet and/or adding a specific packet header to the packet.

2. The method according to claim 1, wherein the specific packet header deleted from the packet and/or the specific packet header added to the packet comprises: an Ethernet header, a Point-to-Point Protocol over Ethernet (PPPoE) header, a user datagram protocol (UDP) header, an Internet Protocol (IP) header, and/or a Generic Routing Encapsulation (GRE) header.

3. The method according to claim 1, wherein the remote user equipment does not support a subscriber identification module (SIM) card of an operator of the core network.

4. The method according to claim 1, wherein the method further comprises:
   receiving, by the session management device, a circuit identifier of the remote user equipment, a device type of the remote user equipment, and/or an association identifier of the remote user equipment.

5. The method according to claim 4, wherein receiving the circuit identifier, the device type, and/or the association identifier comprises:
   receiving, by the session management device, a session message or a registration message from the relay user equipment, wherein the session message or the registration message comprises the association identifier, the circuit identifier, and/or the device type; or
   receiving, by the session management device, a session message from a mobility management function, wherein the session message comprises the association identifier, the circuit identifier, and/or the device type; or
   receiving, by the session management device, the interface message from the UPF device, wherein the interface message comprises the association identifier, the circuit identifier, and/or the device type.

6. The method according to claim 5, wherein the policy related to the remote user equipment is generated by the session management device further based on the association identifier, the circuit identifier, and/or the device type.

7. The method according to claim 1, wherein the policy further comprises at least one of the following:
   an IP address of the remote user equipment for instructing the UPF device to replace the identifier of the remote user equipment in a matched packet with the IP address of the remote user equipment; or a user equipment IP address assignment instruction for instructing the UPF device to assign an IP address to the remote user equipment and replace the identifier of the remote user equipment in a matched packet with the IP address of the remote user equipment that is assigned by the UPF device.

8. A system for identifying and controlling a remote user equipment on a network side, comprising:
a session management device of a core network; and
a user plane function (UPF) device of the core network;
wherein the session management device is configured to:
receive an interface message from the UPF device of the core network, wherein the interface message comprises an identifier of a remote user equipment wherein the remote user equipment is connected to the core network via a relay user equipment, and wherein the identifier of the remote user equipment is a Media Access Control (MAC) address;
generate, based on the identifier of the remote user equipment, a policy for performing service control on packets from the remote user equipment, wherein the policy comprises a packet probing parameter for identification of packets from the remote user equipment, wherein the packet probing parameter comprises the MAC address, and wherein the packet probing parameter corresponds to a parameter of a user plane packet from the remote user equipment; and
send the policy to the UPF device; and
wherein the UPF device is configured to:
receive the policy from the session management device;
receive a packet from the remote user equipment via the relay user equipment, wherein the packet comprises the MAC address;
match the MAC address in the packet with the MAC address in the packet probing parameter to identify the packet from the remote user equipment; and
perform, in response to the matching, service control on the packet from the remote user equipment based on the policy, wherein the policy further comprises a user packet header update instruction for instructing the UPF device to delete a specific packet header from a matched packet and/or add a specific packet header to a matched packet, and wherein performing service control on the packet based on the policy further comprises deleting a specific packet header from the packet and/or adding a specific packet header to the packet.

9. The system according to claim 8, wherein the specific packet header deleted from the packet and/or the specific packet header added to the packet comprises: an Ethernet header, a Point-to-Point Protocol over Ethernet (PPPoE) header, a user datagram protocol (UDP) header, an Internet Protocol (IP) header, and/or a Generic Routing Encapsulation (GRE) header.

10. The system according to claim 8, wherein the remote user equipment does not support a subscriber identification module (SIM) card of an operator of the core network.

11. The system according to claim 8, wherein the packet probing parameter comprises a port number;
wherein the UPF device is configured to match the port number in the packet probing parameter with a port number in a transport layer of the packet, to identify the packet from the remote user equipment.

12. One or more non-transitory computer-readable mediums having processor-executable instructions stored thereon for identifying and controlling a remote user equipment on a network side, wherein the processor-executable instructions, when executed, facilitate:
receiving, by a session management device of a core network, an interface message from a user plane function (UPF) device of the core network, wherein the interface message comprises an identifier of the remote user equipment, wherein the remote user equipment is connected to the core network via a relay user equipment, and wherein the identifier of the remote user equipment is a Media Access Control (MAC) address;
generating, by the session management device, based on the identifier of the remote user equipment, a policy for performing service control on packets from the remote user equipment, wherein the policy comprises a packet probing parameter for identification of packets from the remote user equipment, wherein the packet probing parameter comprises the MAC address, and wherein the packet probing parameter corresponds to a parameter of a user plane packet from the remote user equipment;
sending, by the session management device, the policy to the UPF device;
receiving, by the UPF device, a packet from the remote user equipment via the relay user equipment, wherein the packet comprises the MAC address;
matching, by the UPF device, the MAC address in the packet with the MAC address in the packet probing parameter to identify the packet from the remote user equipment; and
in response to the matching, performing, by the UPF device, based on the policy, service control on the packet from the remote user equipment, wherein the policy further comprises a user packet header update instruction for instructing the UPF device to delete a specific packet header from a matched packet and/or add a specific packet header to a matched packet, and wherein performing service control on the packet based on the policy further comprises deleting a specific packet header from the packet and/or adding a specific packet header to the packet.

13. The one or more non-transitory computer-readable mediums according to claim 12, wherein the specific packet header deleted from the packet and/or the specific packet header added to the packet comprises: an Ethernet header, a Point-to-Point Protocol over Ethernet (PPPoE) header, a user datagram protocol (UDP) header, an Internet Protocol (IP) header, and/or a Generic Routing Encapsulation (GRE) header.

14. The one or more non-transitory computer-readable mediums according to claim 12, wherein the remote user equipment does not support a subscriber identification module (SIM) card of an operator of the core network.

15. The one or more non-transitory computer-readable mediums according to claim 12, wherein the processor-executable instructions, when executed, further facilitate:
receiving, by the session management device, a circuit identifier of the remote user equipment, a device type of the remote user equipment, and/or an association identifier of the remote user equipment.

16. The one or more non-transitory computer-readable mediums according to claim 15, wherein receiving the circuit identifier, the device type, and/or the association identifier comprises:

receiving, by the session management device, a session message or a registration message from the relay user equipment, wherein the session message or the registration message comprises the association identifier, the circuit identifier, and/or the device type; or receiving, by the session management device, a session message from a mobility management function, wherein the session message comprises the association identifier, the circuit identifier, and/or the device type; or receiving, by the session management device, the interface message from the UPF device, wherein the interface message comprises the association identifier, the circuit identifier, and/or the device type.

17. The one or more non-transitory computer-readable mediums according to claim 16, wherein the policy related to the remote user equipment is generated by the session management device further based on the association identifier, the circuit identifier, and/or the device type.

18. The one or more non-transitory computer-readable mediums according to claim 12, wherein the policy further comprises at least one of the following:

an IP address of the remote user equipment for instructing the UPF device to replace the identifier of the remote user equipment in a matched packet with the IP address of the remote user equipment; or a user equipment IP address assignment instruction for instructing the UPF device to assign an IP address to the remote user equipment and replace the identifier of the remote user equipment in a matched packet with the IP address of the remote user equipment that is assigned by the UPF device.

* * * * *